(12) United States Patent
Chen et al.

(10) Patent No.: US 11,306,828 B2
(45) Date of Patent: Apr. 19, 2022

(54) QUICK-CONNECTOR VALVE FOR LIQUID COOLING

(71) Applicant: Quanta Computer Inc., Taoyuan (TW)

(72) Inventors: Chao-Jung Chen, Taoyuan (TW); Yu-Nien Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/139,758

(22) Filed: Dec. 31, 2020

(65) Prior Publication Data
US 2022/0034412 A1  Feb. 3, 2022

Related U.S. Application Data

(60) Provisional application No. 63/059,552, filed on Jul. 31, 2020.

(51) Int. Cl.
| | |
|---|---|
| *F16L 37/34* | (2006.01) |
| *F16K 5/06* | (2006.01) |
| *F16K 31/54* | (2006.01) |
| *F16K 27/06* | (2006.01) |

(52) U.S. Cl.
CPC .......... *F16K 5/0605* (2013.01); *F16K 5/0689* (2013.01); *F16K 27/067* (2013.01); *F16K 31/54* (2013.01); *Y10T 137/87949* (2015.04)

(58) Field of Classification Search
CPC ......... F16L 37/30; F16L 37/02; F16L 37/373; F16K 31/54; Y10T 137/87949; Y10T 137/87965
See application file for complete search history.

(56) References Cited

U.S. PATENT DOCUMENTS

| | | | | |
|---|---|---|---|---|
| 3,276,474 A * | 10/1966 | Gill | ......................... | F16L 29/04 137/614.03 |
| 4,181,149 A * | 1/1980 | Cox | ........................ | F16L 29/04 137/614.02 |
| 4,351,351 A * | 9/1982 | Flory | ................... | F16L 55/1015 137/614.03 |
| 5,090,448 A * | 2/1992 | Truchet | .................... | F16L 37/23 137/614.03 |
| 5,488,972 A * | 2/1996 | McCracken | ............ | F16L 37/36 137/614.06 |
| 2004/0099318 A1* | 5/2004 | Mikiya | .................. | F16L 37/373 137/614.04 |

(Continued)

*Primary Examiner* — Robert K Arundale
(74) *Attorney, Agent, or Firm* — Nixon Peabody LLP

(57) ABSTRACT

A quick-connector comprises a first body portion, a second body portion, and a ball valve. The first body portion defines a first fluid channel. The second body portion defines a second fluid channel. The second body portion is coupled to the first body portion such that the first fluid channel is aligned with the second fluid channel. The first fluid channel and the second fluid channel form a fluid channel extending through the quick-connector. The ball valve is positioned in the fluid channel extending through the quick-connector. Movement of the first body portion and the second body portion relative to each other causes the ball valve to move between a flow position and a sealed position. In the flow position, the ball valve allows fluid to flow through the quick-connector. In the sealed position, the ball valve prevents fluid from flowing through the quick-connector.

20 Claims, 9 Drawing Sheets

(56) References Cited

U.S. PATENT DOCUMENTS

| | | | |
|---|---|---|---|
| 2005/0087239 A1* | 4/2005 | Kohda | F16L 37/23 137/614.03 |
| 2005/0087240 A1* | 4/2005 | Kohda | F16L 37/23 137/614.03 |
| 2005/0087241 A1* | 4/2005 | Kohda | F16L 37/373 137/614.03 |
| 2009/0205726 A1* | 8/2009 | Kouda | F16L 37/23 137/614.03 |
| 2009/0314978 A1* | 12/2009 | Zenz | F16L 55/1022 251/250 |
| 2012/0211107 A1* | 8/2012 | Haunhorst | F16L 37/0841 137/614.06 |
| 2013/0000763 A1* | 1/2013 | Haunhorst | F16L 37/36 137/614.01 |
| 2013/0032234 A1* | 2/2013 | Densel | F16L 37/373 137/798 |
| 2020/0347977 A1* | 11/2020 | Dornburg | F16L 37/32 |
| 2021/0239250 A1* | 8/2021 | Hamkens | F16L 37/373 |

* cited by examiner

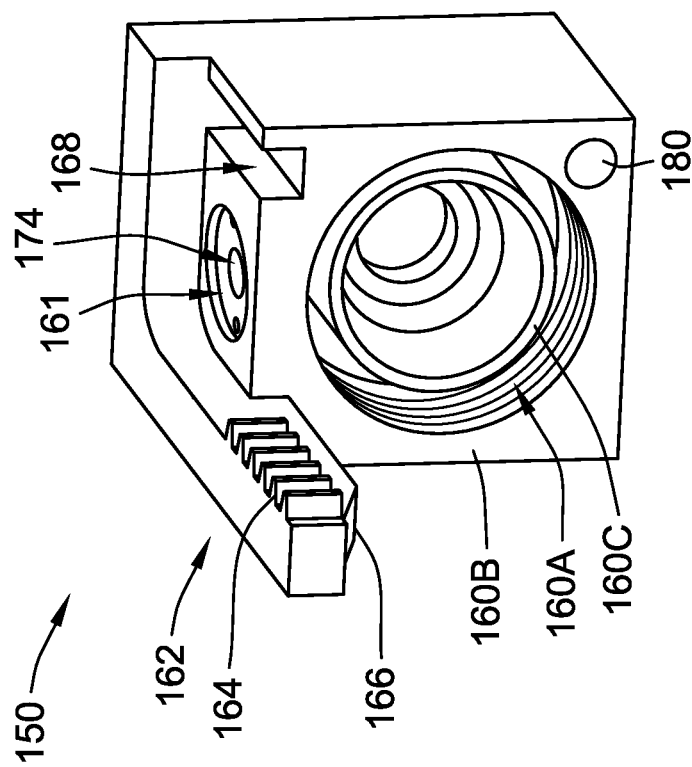
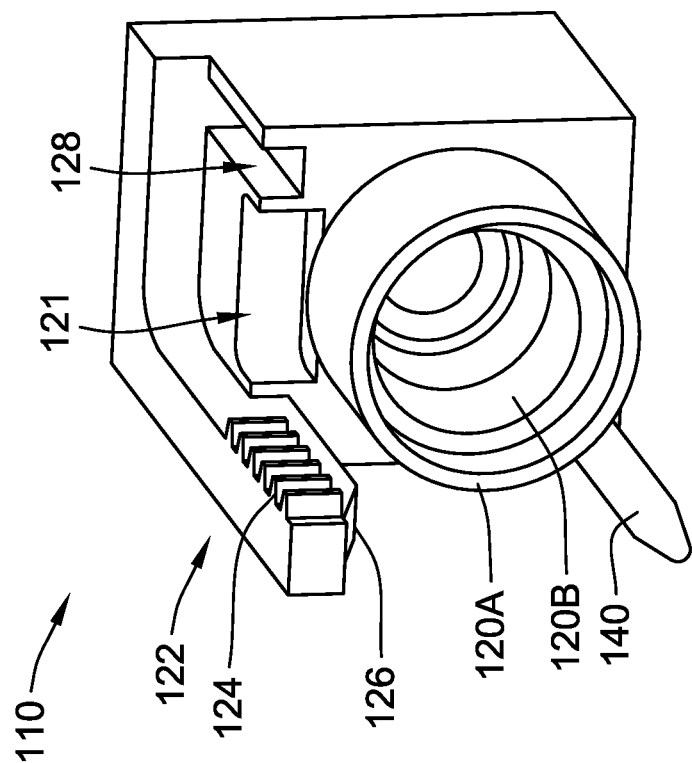
FIG. 3B
FIG. 3A

QUICK-CONNECTOR VALVE FOR LIQUID COOLING

CROSS-REFERENCE TO RELATED APPLICATIONS

This application claims priority under 35 U.S.C. § 119 to U.S. Provisional Application No. 63/059,552, entitled "No Pressure Drop Liquid Quick Connector," and filed on Jul. 31, 2020. The contents of that application are hereby incorporated by reference herein in their entirety.

TECHNICAL FIELD

The present disclosure relates generally to systems and devices for coupling components for liquid-cooling applications. More particularly, aspects of this disclosure relate to a quick-connector that allows fluid to flow when two components are connected by the quick-connector, and prevents fluid from flowing when the two components are not connected by the quick-connector.

BACKGROUND

Many computing devices, such as servers, generate large amounts of heat during operation. Different techniques can be used to remove this heat and cool down the computing devices, such as flowing air through the housing of the device. One such technique is liquid cooling, which utilizes liquid to carry away heat generated by the computing device. When used with servers, fluid pipes can be used to transport liquid from a source to the server itself. Ports on the fluid pipe can be connected to appropriate ports on the housing of the server. The ports on the server housing may connect to internal tubes that can transport the liquid as needed within the server housing. Traditional quick-connectors often cause the liquid to undergo sudden pressure changes as the liquid flows through the quick-connector. As a consequence, more energy is required to pump the liquid through the quick-connector. Thus, new systems and devices for connecting components in liquid-cooling applications are needed.

SUMMARY

The various examples of the present disclosure are directed toward a quick-connector for selectively allowing fluid flow. The quick-connector comprises a first body portion, a second body portion, and at least one ball valve. The first body portion defines a first fluid channel. The second body portion defines a second fluid channel. The second body portion is coupled to the first body portion such that the first fluid channel is aligned with the second fluid channel. The first fluid channel and the second fluid channel form a fluid channel extending through the quick-connector. The at least one ball valve is positioned in the fluid channel extending through the quick-connector. Movement of the first body portion and the second body portion relative to each other causes the at least one ball valve to move between a flow position and a sealed position. In the flow position, the at least one ball valve allows fluid to flow through the first fluid channel and the second fluid channel. In the sealed position, the at least one ball valve prevents fluid from flowing through the first fluid channel and the second fluid channel.

In some cases, the quick-connector comprises a first gear and a second gear. The first gear is formed on a surface of the first body portion, a surface of the second body portion, or the surface of the first body portion and the surface of the second body portion. The second gear is coupled to the at least one ball valve via a gear shaft, and engaged with the first gear. In some cases, movement of the first body portion and the second body portion relative to each other drives the first gear. Driving the first gear causes the second gear to move the ball valve between the flow position and the sealed position. In some cases, the first gear is a rack gear, and second gear is a pinion gear. In some cases, linear movement of the first body portion relative to the second body portion linearly drives the first gear. Linearly driving the first gear rotates the second gear and causes the ball valve to rotate between the flow position and the sealed position. In some cases, the second gear and the ball valve rotate about an axis that is generally perpendicular to the fluid channel formed by the first fluid channel and the second fluid channel.

In some cases, the rack gear is formed on a surface of the first body portion, and the pinion gear is coupled to the second body portion, such that the rack gear engages the pinion gear when the first body portion is coupled to the second body portion. In some cases, the first body portion includes an arm extending toward the second body portion. The arm includes a guide rail that is configured to slide into a guide slot defined in the second body portion when the second body portion is coupled to the first body portion. In some cases, the guide rail is formed on a bottom surface of the protrusion, and the rack gear is formed on a lateral surface of the protrusion.

In some cases, the quick-connector further comprises a first sealing member and a second sealing member. The first sealing member is disposed on a first side of the at least one ball valve. The second sealing member is disposed on a second side of the at least one ball valve. The first sealing member and the second sealing member aid in preventing fluid from bypassing the at least one ball valve. In some cases, the first sealing member is a first O-ring disposed in the first fluid channel or the second fluid channel, and the second sealing member is a second O-ring disposed in the first fluid channel or the second fluid channel.

In some cases, the at least one ball valve includes a first ball valve positioned within the first fluid channel and a second ball valve positioned within the second fluid channel. Movement of the first body portion and the second body portion relative to each other moves both the first ball valve and the second ball valve between the flow position and the sealed position. In some cases, the first body portion includes a first rack gear formed on a surface of the first body portion, and a first pinion gear coupled to the first ball valve via a first gear shaft. The second body portion includes a second rack gear formed on a surface of the second body portion, and a second pinion gear coupled to the second ball valve via a second gear shaft. In some cases, the first rack gear of the first body portion engages the second pinion gear of the second body portion when the first body portion is coupled to the second body portion. The first pinion gear of the first body portion engages the second rack gear of the second body portion when the first body portion is coupled to the second body portion. In some cases, linear movement of the first body portion and the first rack gear relative to the second body portion rotates the second pinion gear, and causes the second ball valve to rotate between the flow position and the sealed position within the second fluid channel. Linear movement of the second body portion and the second rack gear relative to the first body portion rotates the first pinion gear, and causes the first ball valve to rotate between the flow position and the sealed position within the first fluid channel.

In some cases, the at least one ball valve is disposed in the first fluid channel of the first body portion. In some cases, the first fluid channel includes a first region having a height greater than a height of the ball valve and a second region having a height less than the height of the ball valve. In some cases, the first ball valve abuts a first end of the first region of the first fluid channel. The first body portion includes a cap positioned at a second end of the first fluid channel to secure the first ball valve within the first fluid channel.

In some cases, the first body portion includes an annular groove, and the second body portion includes an annular protrusion configured to fit within the annular groove. The first body portion and the second body portion are coupled to each other at least in part via a friction fit between the annular groove and the annular protrusion. In some cases, the quick-connector further comprises a fluid tray positioned underneath the first body portion and the second body portion. The fluid tray is configured to collect fluid leaking from the first body portion or the second body portion.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings.

FIG. 3A is a perspective view of the first body portion of the example quick-connector of FIG. 1A, according to aspects of the present disclosure.

FIG. 3B is a perspective view of the second body portion of the example quick-connector of FIG. 1A, according to aspects of the present disclosure.

Figure 1A:
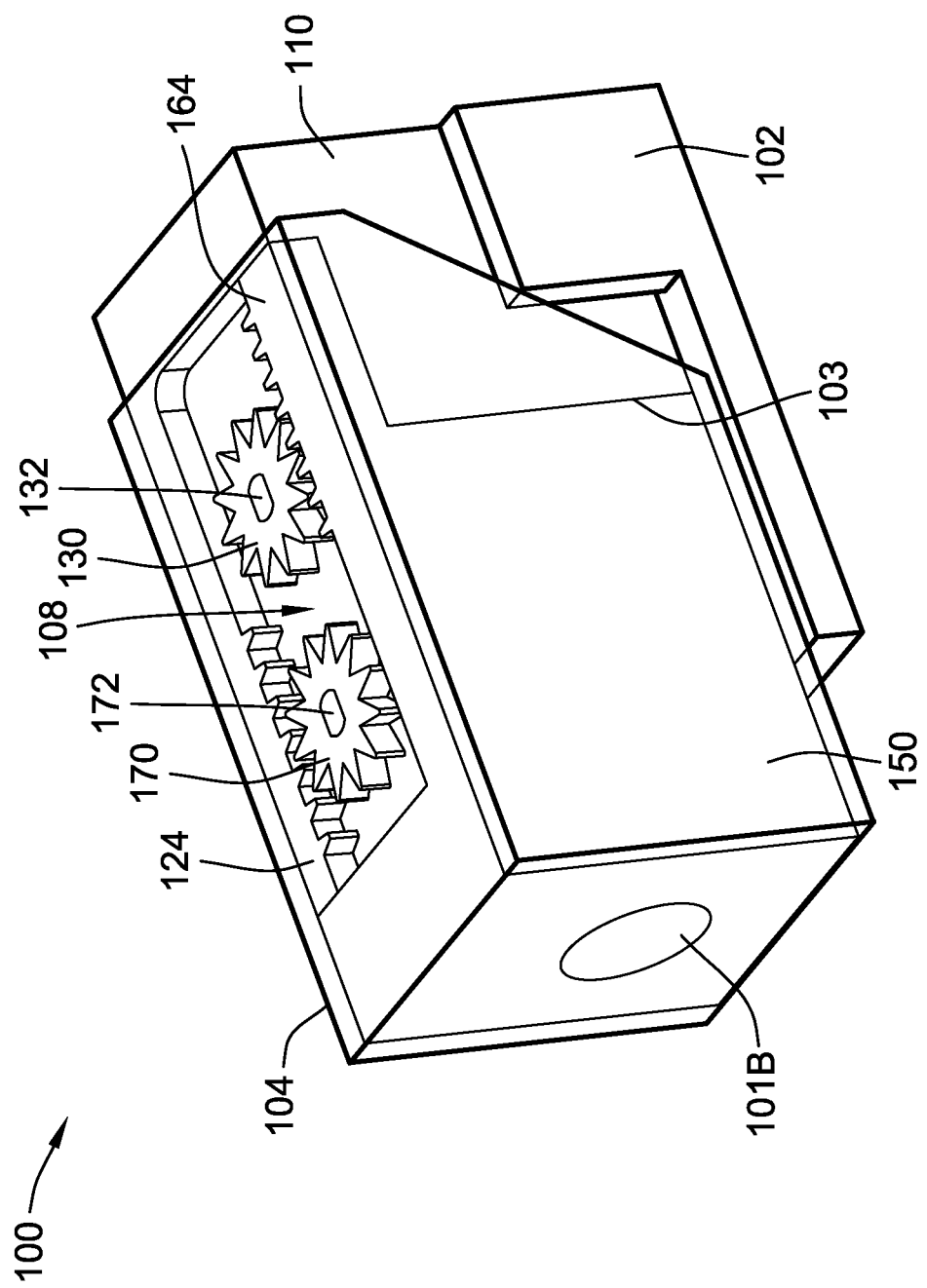
FIG. 1A is a perspective view of an example quick-connector in a coupled configuration, according to aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Aspects of the present disclosure relate to a quick-connector for use in liquid cooling applications. The quick-connector described herein can be used to connect ports on a liquid-transporting manifold to ports on a server housing, while preventing the liquid (or other fluids) from leaking when the manifold is disconnected from the server housing.

FIG. 1A shows an example quick-connector 100. The quick-connector 100 is formed from at least a first body portion 110 and a second body portion 150. The first body portion 110 defines a fluid inlet 101A (shown in FIG. 1B), and the second body portion 150 defines a fluid outlet 101B. In FIG. 1A, the quick-connector 100 is in a coupled configuration, where the first body portion 110 is coupled to the second body portion 150. In the coupled configuration, the larger fluid channel allows fluid to flow from the first body portion 110 to the second body portion 150, from the fluid inlet 101A to the fluid outlet 101B.

The quick-connector 100 can also include a fluid tray 102 positioned underneath both the first body portion 110 and the second body portion 150. The fluid tray 102 is configured to catch liquid that may inadvertently leak from the quick-connector 100 at a junction 103 between the first body portion 110 and the second body portion 150.

The first body portion 110 includes a rack gear 124 and a pinion gear 130, while the second body portion 150 includes a rack gear 164 and a pinion gear 170. The pinion gear 130 is mounted on a gear shaft 132, while the pinion gear 170 is mounted on a gear shaft 172. When the quick-connector 100 is in the coupled configuration, the teeth of the rack gear 124 of the first body portion 110 engage the teeth of the pinion gear 170 of the second body portion 150, and the teeth of the rack gear 164 of the second body portion 150 engage the teeth of the pinion gear 130 of the first body portion 110. As is discussed in further detail herein, the rack gears 124 and 164, and the pinion gears 130 and 170 aid in allowing fluid (such as the cooling liquid used in liquid cooling applications) to flow through the quick-connector 100.

The quick-connector 100 can further include a cover 104 that covers the upper portions of the first body portion 110 and the second body portion 150. The outer ends of the first body portion 110 and the second body portion 150 are raised, such that the rack gears 124 and 164 and the pinion gears 130 and 170 are positioned in a lowered central area 108. The cover 104 covers the lowered central area 108 and aids in preventing fluid from leaking out of the top of the quick-connector 100.

Figure 1B:
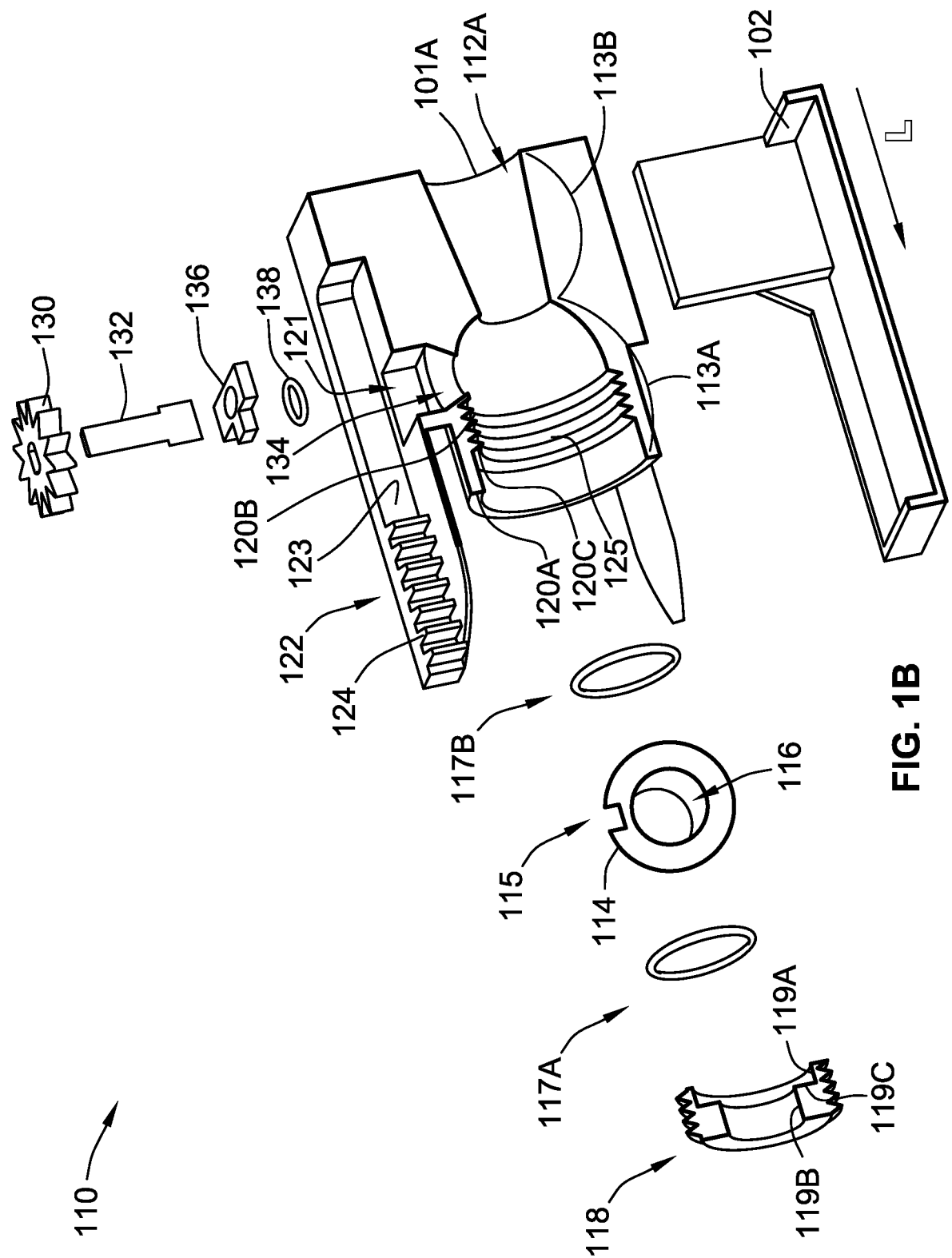
FIG. 1B is an exploded partial cross-sectional view of a first body portion of the quick-connector of FIG. 1A, according to aspects of the present disclosure.

FIG. 1B shows an exploded partial cross-sectional view of the first body portion 110. The first body portion 110 defines a fluid channel 112A that extends from the fluid inlet 101A through the entire length of the first body portion 110 along an axis L. The first body portion 110 includes a ball valve 114, two sealing members (shown here as O-rings 117A and 117B), and a cap 118 that are all configured to be disposed within the fluid channel 112A. The ball valve 114 has a generally spherical shape with a valve channel 116 extending through the length of the ball valve 114. A slot 115 is defined in the top of the ball valve 114. The cap 118 has an annular shape with an outer portion 119A and an inner portion 119B. The inner portion 119B is shorter along the axis L. The cap 118 thus forms an annular shoulder 119C at the junction between the outer portion 119A and the inner portion 119B of the cap 118.

The fluid channel 112A includes an inner region 113A and an outer region 113B. The inner region 113A is positioned proximal to the junction 103 (FIG. 1A) between the first body portion 110 and the second body portion 150. An inner cylindrical surface 125 of the first body portion 110 within the inner region 113A is threaded. The outer region 113B is positioned distal to the junction 103 between the first body portion 110 and the second body portion 150. The inner region 113A has a spherical shape so that the ball valve 114 can be positioned within the inner region 113A of the fluid channel 112A.

In the illustrated implementation, the outer region 113B has a varying height along the axis L. In other implementations, the outer region 113B has a constant height along the axis L. In either implementation, the height of the outer region 113B at the boundary between the inner region 113A and the outer region 113B is less than the height of the ball valve 114. Thus, the ball valve 114 is able to fit within the spherically-shaped inner region 113A of the fluid channel 112A when the first body portion 110 is assembled, and cannot fit within the outer region 113B of the fluid channel 112A.

The first body portion 110 includes an outer annular protrusion 120A and an inner annular protrusion 120B. The inner annular protrusion 120B extends radially inward directly from the outer annular protrusion 120A, and extends a shorter distance along the axis L than the outer annular protrusion 120A. Thus, an annular shoulder 120C is formed at the junction between the outer annular protrusion 120A and the inner annular protrusion 120B. The first body portion 110 further defines a gear shaft channel 134 and a slot 121. The gear shaft channel 134 is defined through the top of the outer annular protrusion 120A and the inner annular protrusion 120B. The slot 121 has a rectangular shape and is defined above the outer annular protrusion 120A.

The first body portion 110 further includes the arm 122, the pinion gear 130, the gear shaft 132, a sealing member (shown as an O-ring 136), and a cover plate 138. The cover plate 138 has a generally rectangular shape that matches the rectangular shape of the slot 121. The rack gear 124 is defined on an inner lateral surface 123 of the arm 122. A guide rail 126 (FIG. 3A) projects downward from the underside of the arm 122. The guide rail 126 can have a generally square or rectangular profile. When the first body portion 110 is assembled, the gear shaft 132 extends from the inner region 113A of the fluid channel 112A, and upward through the gear shaft channel 134. The gear shaft 132 further extends through both the O-ring 136 and the cover plate 138, which will be positioned within the slot 121 of the first body portion 110.

Figure 1C:
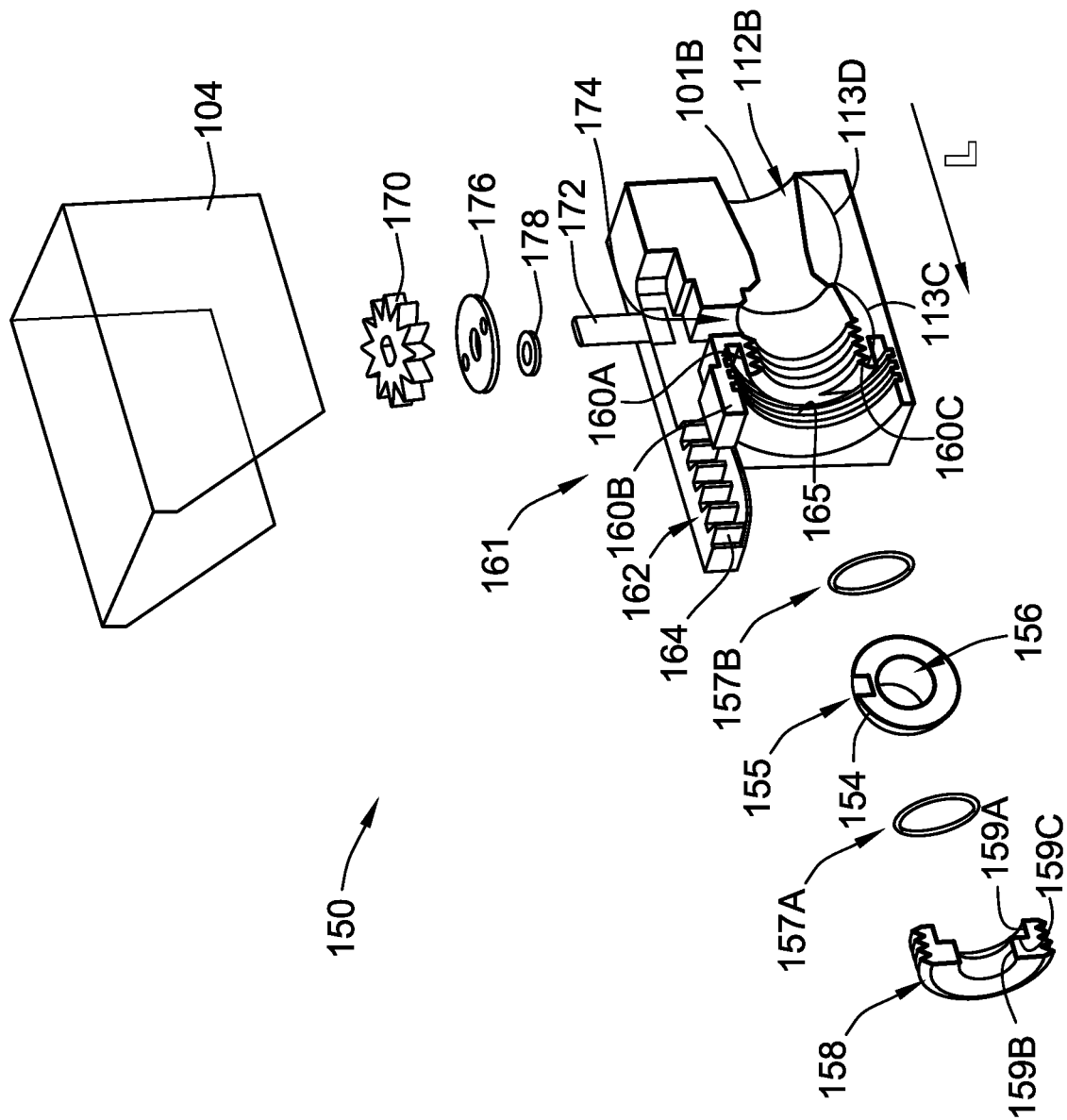
FIG. 1C is an exploded partial cross-sectional view of a second body portion of the quick-connector of FIG. 1A, according to aspects of the present disclosure.

FIG. 1C shows an exploded partial cross-sectional view of the second body portion 150. The second body portion 150 defines a fluid channel 112B that extends through the entire length of the second body portion 150 to the fluid outlet 101B, along an axis L. The second body portion 150 includes a ball valve 154, two sealing members (shown here as O-rings 157A and 157B), and a cap 158 that are all configured to be disposed within the fluid channel 112B. The ball valve 154 has a generally spherical shape with a valve channel 156 extending through the length of the ball valve 154. A slot 155 is defined in the top of the ball valve 154. The cap 158 has an annular shape with an outer portion 159A and an inner portion 159B. The inner portion 159B is shorter along the axis L. The cap 158 thus forms an annular shoulder 159C at the junction between the outer portion 159A and the inner portion 159B of the cap 158.

The fluid channel 112B includes an inner region 113C and an outer region 113D. The inner region 113C is positioned proximal to the junction 103 (FIG. 1A) between the first body portion 110 and the second body portion 150. An inner cylindrical surface 165 of the second body portion 150 within the inner region 113C is threaded. The outer region 113D is positioned distal to the junction 103 between the first body portion 110 and the second body portion 150. The inner region 113C has a spherical shape, so that the ball valve 154 can be positioned within the inner region 113C of the fluid channel 112B.

In the illustrated implementation, the outer region 113D has a varying height along the axis L. In other implementations, the outer region 113D has a constant height along the axis L. In either implementation, the height of the outer region 113D at the boundary between the inner region 113C, and the outer region 113D is less than the height of the ball valve 154. Thus, the ball valve 154 is able to fit within the spherically-shaped inner region 113C of the fluid channel 112B when the second body portion 150 is assembled, and cannot fit within the outer region 113D of the fluid channel 112B.

The second body portion 150 includes an annular groove 160A that is formed by an outer annular protrusion 160B and an inner annular protrusion 160C. The inner annular protrusion 160B extends a shorter distance along the axis L than the outer annular protrusion 160B. The outer annular protrusion 160B and the inner annular protrusion 160C are separated by the annular groove 160A.

The second body portion 150 further includes a gear shaft channel 174 and a depression 161. The gear shaft channel 174 is defined through the top of the outer annular protrusion 160B and the inner annular protrusion 160C. The depression 161 has a circular shape and is defined in the top of the outer annular protrusion 160B.

The second body portion 150 further includes the arm 162, the pinion gear 170, the gear shaft 172, a sealing member (shown as an O-ring 176), and a cover plate 178. The cover plate 178 has a generally circular shape that matches the circular shape of the depression 161. The rack gear 164 is defined on an inner lateral surface 163 of the arm 162. A guide rail 166 projects downward from the underside of the arm 162. The guide rail 166 can have a generally square or rectangular profile. When the second body portion 150 is assembled, the gear shaft 172 extends from the inner region 113C of the fluid channel 112B, and upward through the gear shaft channel 174 that is defined through the top of the outer annular protrusion 160B. The gear shaft 172 further extends through both the O-ring 176 and the cover plate 178, which will be positioned within the depression 161 of the second body portion 150.

Figure 1D:
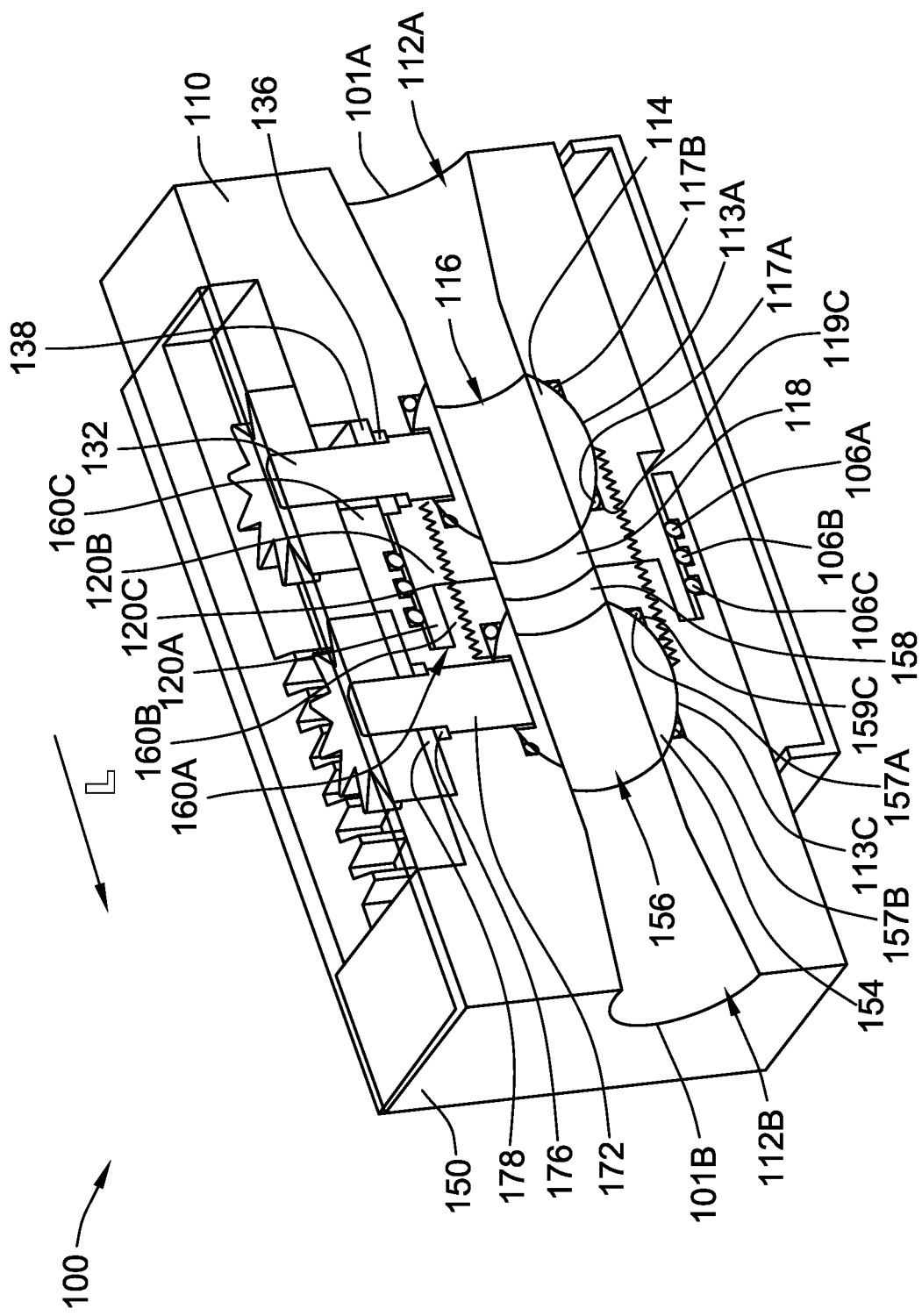
FIG. 1D is a cross-sectional view of the example quick-connector of FIG. 1A in the coupled configuration, according to aspects of the present disclosure.

FIG. 1D shows a cross-sectional view of the example quick-connector 100 in the coupled configuration. When the quick-connector 100 is in the coupled configuration, the fluid channel 112A is aligned with the fluid channel 112B. The fluid channel 112A and the fluid channel 112B thus form a single larger fluid channel that extends through the entire length of the quick-connector 100 along the axis L, from the fluid inlet 101A (one end of the fluid channel 112A) to the fluid outlet 101B (one end of the fluid channel 112B). The ball valve 114 is positioned at an end of the fluid channel 112A nearest to the fluid channel 112B. The ball valve 154 is positioned at an end of the fluid channel 112B nearest to the fluid channel 112A.

In FIG. 1D, the ball valves 114 and 154 are rotated to a flow position. In the flow position, the valve channel 116 of the ball valve 114 is aligned with the fluid channel 112A, and thus extends generally parallel to the fluid channel 112A. Similarly, the valve channel 156 of the ball valve 154 is aligned with the fluid channel 112B, and thus extends generally parallel to the fluid channel 112B. Thus, when the ball valves 114 and 154 are in the flow position, fluid (such as the liquid used for liquid cooling applications) is able to flow from the fluid inlet 101A to the fluid outlet 101B, through (i) the fluid channels 112A and 112B and (ii) the valve channels 116 and 156. Thus, fluid can flow through the quick-connector 100 when in the coupled configuration.

The ball valve 114 is disposed in the spherically-shaped inner region 113A of the fluid channel 112A, along with the O-rings 117A and 117B, and the cap 118. The ball valve 114 is positioned between the O-ring 117A and the O-ring 117B. The O-ring 117A is positioned between the ball valve 114 and the cap 118. The O-ring 117B is positioned between the surface of the inner region 113A and the ball valve 114. The O-ring 117B forms a substantially liquid-tight seal between the surface of the inner region 113A and the exterior of the ball valve 114.

Similarly, the ball valve 154 is disposed in the spherically-shaped inner region 113C of the fluid channel 112B, along with the O-rings 157A and 157B, and the cap 158. The ball valve 154 is positioned between the O-ring 157A and the O-ring 157B. The O-ring 157A is positioned between the ball valve 154 and the cap 158. The O-ring 157B is positioned between the surface of the inner region 113C and the ball valve 154. The O-ring 157B forms a substantially liquid-tight seal between the surface of the inner region 113C and the exterior of the ball valve 154.

The cap 118 is positioned at the inner end of the fluid channel 112A, while the cap 158 is positioned at the inner end of the fluid channel 112B. Thus, the cap 118 and the cap 158 are abut each other when the quick-connector 100 is in the coupled configuration. The O-ring 117B is seated within the annular shoulder 119C of the cap 118, and the O-ring 157B is seated within the annular shoulder 159C of the cap 158. The O-ring 117B thus forms a substantially liquid-tight seal between the annular shoulder 119C of the cap 118 and the exterior of the ball valve 114. Similarly, the O-ring 157B forms a substantially liquid-tight seal between the annular shoulder 159C of the cap 158 and the exterior of the ball valve 154.

The O-rings 117A, 117B, 157A, and 157B aid in ensuring that when fluid flows through the fluid channels 112A and 112B, the fluid flows through the valve channels 116 and 156 of the ball valves 114 and 154, instead of traveling around the outside of the ball valves 114 and 154. The O-rings 117A, 117B, 157A, and 157B can be formed from a variety of different materials, such as rubber, paper, silicone, metal, cork, felt, neoprene, nitrile rubber, fiberglass, polytetrafluoroethylene (PTFE), a plastic polymer, or any combination. While O-rings are illustrated as an example type of sealing member, generally any type of sealing member could be used in place of the O-rings 117A, 117B, 157A, and 157B.

The cap 118 is coupled to the inner cylindrical surface 125 (FIG. 1B) of the first body portion 110 at the end of the fluid channel 112A nearest to the fluid channel 112B. The cap 118 aids in securing the ball valve 114 within the fluid channel 112A, and in preventing the ball valve 114 from falling out of the fluid channel 112A when the first body portion 110 and the second body portion 150 are decoupled from each other. In the illustrated implementation, the exterior surface of the cap 118 is threaded. The threads of the exterior surface of the cap 118 engage with the threads of the inner cylindrical surface 125, so that the cap 118 is coupled to the first body portion 110 at the end of the inner region 113A nearest to the fluid channel 112B. The cap 118 thus holds the ball valve 114 in place within the inner region 113A of the fluid channel 112A.

Similar to the cap 118, the cap 158 is coupled to the inner cylindrical surface 165 (FIG. 1C) of the second body portion 150 at the end of the fluid channel 112B nearest to the fluid channel 112A. The cap 158 aids in securing the ball valve 154 within the fluid channel 112B, and in preventing the ball valve 154 from falling out of the fluid channel 112B when the first body portion 110 and the second body portion 150 are decoupled from each other. In the illustrated implementation, the exterior surface of the cap 158 is threaded. The threads of the exterior surface of the cap 158 engage with the threads of the inner cylindrical surface 165, so that the cap 158 is coupled to the second body portion 150 at the end of the inner region 113C nearest to the fluid channel 112A. The cap 158 thus holds the ball valve 154 within the inner region 113C of the fluid channel 112B.

The first body portion 110 and the second body portion 150 can be attached together with a friction fit. When the quick-connector 100 is in the coupled configuration shown in FIG. 1D, the outer annular protrusion 120A of the first body portion 110 extends into the annular groove 160A of the second body portion 150. The outer annular protrusion 120A of the first body portion 110 is thus positioned between the outer annular protrusion 160B and the inner annular protrusion 160C of the second body portion 160. Correspondingly, the inner annular protrusion 160C of the second body portion 160 is seated on the annular shoulder 120C of the first body portion 110.

The quick-connector 100 also includes sealing members (shown as O-rings 106A, 106B, and 106C) that encircle the outer annular protrusion 120A. When the quick-connector 100 is in the coupled configuration, the O-rings 106A, 106B, and 106C are positioned between the outer annular protrusion 120A of the first body portion 110 and the outer annular protrusion 160B of the second body portion 150. The O-rings 106A, 106B, and 106C (which can be O-rings) aid in preventing liquid from leaking out of the quick-connector 100 between the outer annular protrusion 120A and the outer annular protrusion 160B. The O-rings 106A, 106B, and 106C can be made from the same material or similar material as the O-rings 117A, 117B, 157A, and 157B.

In some implementations, a friction fit exists between the first body portion 110 and the second body portion 150 when the outer annular protrusion 120A is inserted into the annular groove 160A, regardless of the presence of the O-rings 106A, 106B, and 106C. In these implementations, the O-rings 106A, 106B, and 106C can either improve the friction fit between the first body portion 110 and the second body portion 150, or have no impact. In other implementations the friction fit only exists when the O-rings 106A, 106B, and 106C are present.

As shown in FIG. 1D, the gear shaft 132 extends upward through the gear shaft channel 134 (FIG. 1B). The gear shaft 132 also extends upward through the O-ring 136 and the cover plate 138, which are seated in the slot 121 (FIG. 1B). The O-ring 136 aids in ensuring that no fluid leaks out of the gear shaft channel 134. The O-ring 136 can be made from the same material or similar material as the O-rings 106A, 106B, 106C, 117A, 117B, 157A, and 157B.

The gear shaft 172 extends upward through the gear shaft channel 174 (FIG. 1C). The gear shaft 172 also extends through the O-ring 176 and the cover plate 178, which are seated in the depression 161 (FIG. 1C). The O-ring 176 aids in ensuring that no fluid leaks out of the gear shaft channel 174. The O-ring 176 can be made from the same material or similar material as the O-rings 106A, 106B, 106C, 117A, 117B, 136, 157A, and 157B.

As discussed herein, when the quick-connector 100 is in the coupled configuration shown in FIG. 1D, the valve channel 116 of the ball valve 114 is aligned with the fluid channel 112A of the first body portion 110. Similarly, the valve channel 156 of the ball valve 154 is aligned with the fluid channel 112B of the second body portion 150. Thus, fluid (such as liquid used in liquid cooling applications) is able to flow through the quick-connector 100 when the quick-connector 100 is in the coupled configuration, through the fluid channel 112A and the fluid channel 112B.

Figure 2A:
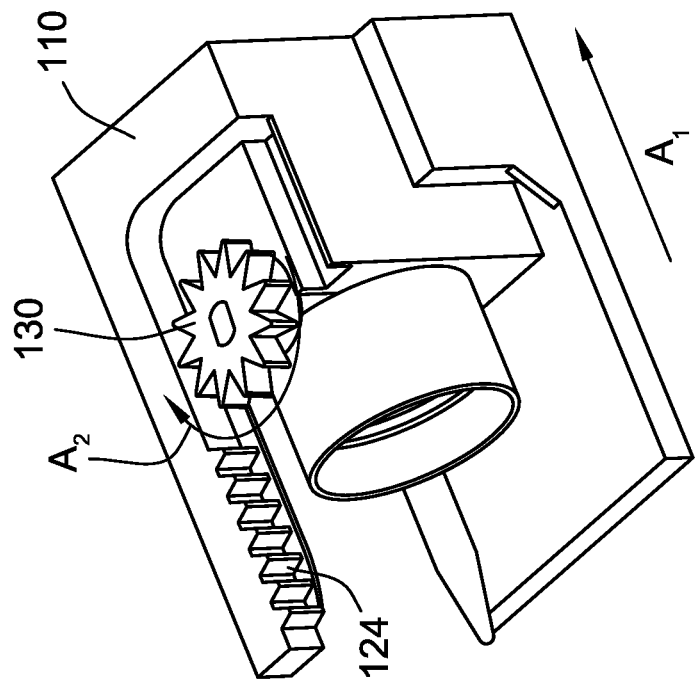
FIG. 2A is a perspective view of the example quick-connector of FIG. 1A in an uncoupled configuration, according to aspects of the present disclosure.
Figure 2A:
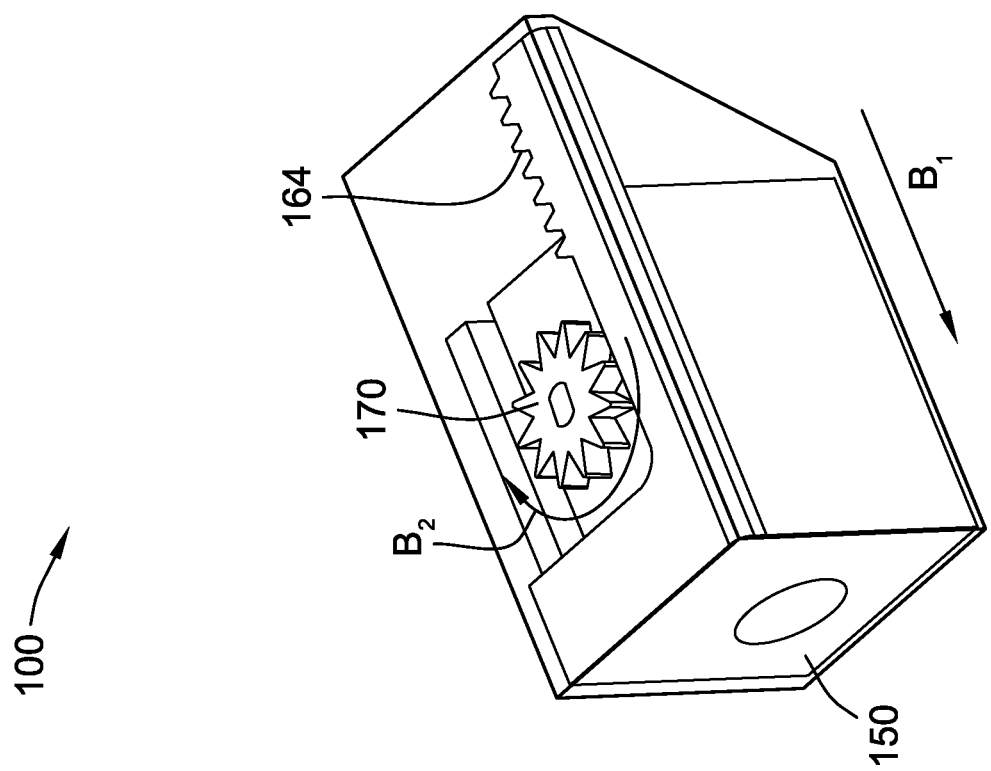

FIG. 2A shows the example quick-connector 100 in a decoupled configuration, where the first body portion 110 is not coupled to the second body portion 150. When the quick-connector 100 is moved from the coupled configuration (shown in FIG. 1A) to the decoupled configuration, movement of the first body portion 110 and the second body portion 150 relative to each other drives the rack gears 124 and 164 linearly. In turn, linear movement of the rack gears 124 and 164 drives the pinion gears 130 and 170 rotationally. Specifically, as the rack gear 124 of the first body portion 110 moves linearly in the direction of arrow $A_1$, the pinion gear 170 of the second body portion 150 rotates clockwise in the direction of arrow $A_2$. Similarly, as the rack gear 164 of the second body portion 150 moves linearly in the direction of arrow $B_1$, the pinion gear 130 of the first body portion 110 rotates clockwise in the direction of arrow $B_2$.

Figure 2B:
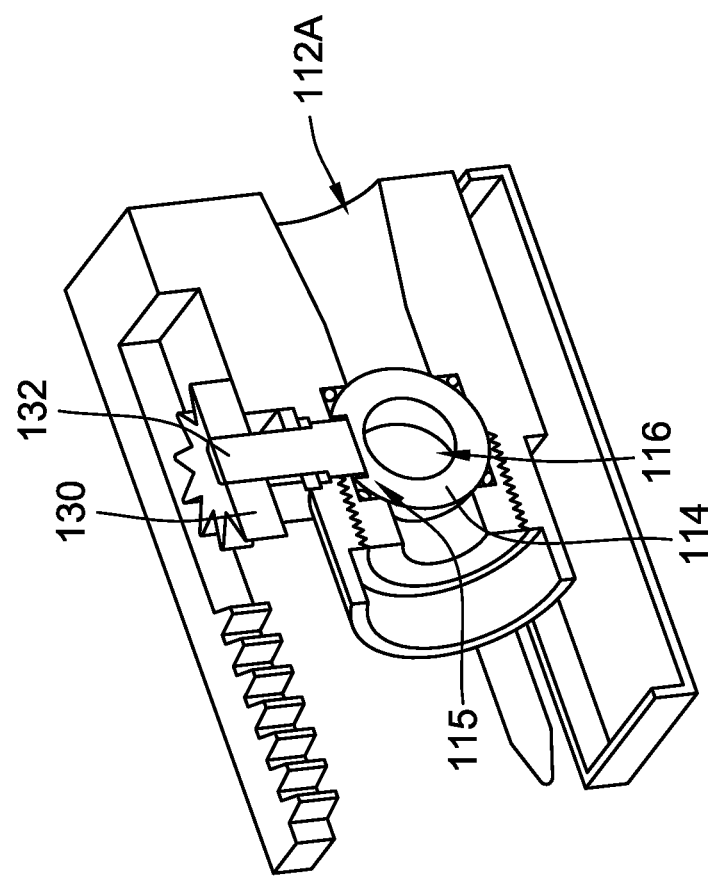
FIG. 2B is a cross-sectional view of the example quick-connector of FIG. 1A in the uncoupled configuration, according to aspects of the present disclosure.
Figure 2B:
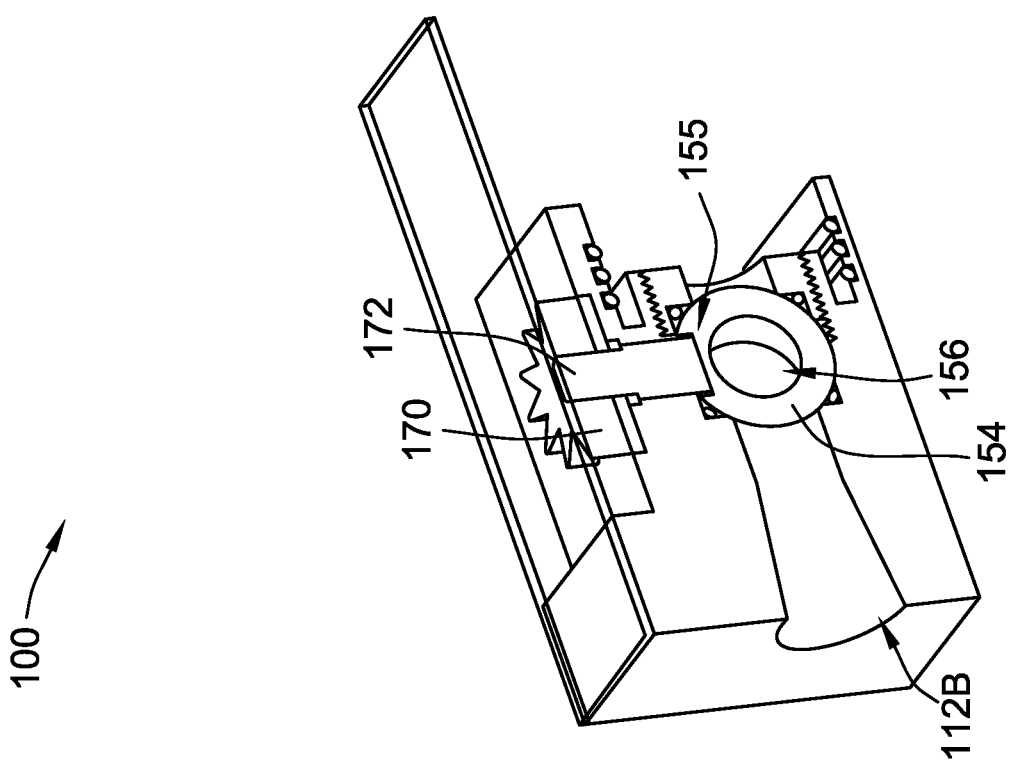

FIG. 2B shows a cross-sectional view of the example quick-connector 100 in the decoupled configuration. As shown, the rotational movement of the pinion gear 130 rotates the gear shaft 132 and the ball valve 114 within the fluid channel 112A, from the flow position to a sealed position. The ball valve 114 rotates about an axis perpendicular to the fluid channel 112A. The valve channel 116 of the ball valve 114 is thus no longer aligned with the fluid channel 112A, but instead extends generally perpendicular to the fluid channel 112A. As such, the ball valve 114 prevents any fluid from flowing through the fluid channel 112A when in the sealed position.

Similarly, the rotational movement of the pinion gear 170 rotates the gear shaft 172 and the ball valve 154 within the fluid channel 112B, from the flow position to a sealed position. The ball valve 154 rotates about an axis perpendicular to the fluid channel 112B. The valve channel 156 of the ball valve 154 is thus no longer aligned with the fluid channel 112B, but instead extends generally perpendicular to the fluid channel 112B. As such, the ball valve 154 prevents any fluid from flowing through the fluid channel 112B when in the sealed position.

In some implementations, the gear shafts 132 and 172 are fixed to the ball valves 114 and 154, for example via adhesive or some other fastening mechanism. In other implementations, the gear shafts 132 and 172 are not fixed to the ball valves 114 and 154, but instead rest in the slots 115 and 155 defined in the upper surfaces of the ball valves 114 and 154. The gear shafts 132 and 172 and/or the ball valves 114 and 154 can have rotation-locking features that prevent relative rotation between the gear shafts 132 and 172 and the ball valves 114 and 154, respectively. The gear shafts 132 and 172 can also be coupled to the pinion gears 130 and 170, respectively, in a similar fashion.

For example, the gear shafts 132 and 172 can have profiles of a first shape (e.g., oblong, circular, etc.), while the slots 115 and 155 defined in the upper surface of the ball valves 114 and 154 can have profiles of a second shape (e.g., square, rectangular) different than the first shape. When the gear shafts 132 and 172 rotate, the unmatched profiles cause the ball valves 114 and 154 to rotate with the gear shafts 132 and 172. In still other implementations, the gear shafts 132 and 172, and the slots 115 and 155, all have profiles of the same general shape (e.g., square, rectangular), such that the gear shafts 132 and 172 are not able to rotate within the slots 115 and 155.

In yet another example, the gear shafts 132 and 172 can have positive features (e.g. bosses, protrusions, etc.) that mate with negative features (e.g., apertures, channels, etc.) defined in the ball valves 114 and 154, thereby locking relative rotation. In still another example, the ball valves 114 and 154 can have positive features that mate with negative features defined in the gear shafts 132 and 172, thereby locking relative rotation.

FIG. 3A shows a perspective view of the first body portion 110, facing the outer annular protrusion 120A and the inner annular protrusion 120B. The slot 121 in the first body portion 110, the rack gear 124, and the guide rail 126 are all visible. FIG. 3A also shows a guide slot 128 and a guide pin 140. The guide slot 128 has a generally square or rectangular profile. The guide slot 128 is defined in the upper surface of the first body portion 110, opposite from the arm 122. The guide pin 140 projects outward from the first body portion 110, and is generally parallel to the arm 122. The guide pin 140 has a generally cylindrical profile, and can have a tapered tip.

FIG. 3B shows a perspective view of the second body portion 150, facing the outer annular protrusion 160B, the inner annular protrusion 160C, and the annular groove 160A defined between the outer annular protrusion 160B and the inner annular protrusion 160C. The depression 161 in the second body portion 150, the rack gear 164, the guide rail 166, and the upper end of the gear shaft channel 174 are all visible. FIG. 4B also shows a guide slot 168 and a guide channel 180. The guide slot 168 has a generally square or rectangular profile. The guide slot 168 is defined in the upper surface of the second body portion 150 opposite from the arm 162. The guide channel 180 extends into the second body portion 150, and generally has a cylindrical profile.

The various rails, slots, pins, and channels aid in aligning the first body portion 110 and the second body portion 150 when the quick-connector 100 is moved to the coupled configuration. The square or rectangular profile of the guide rail 166 matches the square or rectangular profile of the guide slot 128 of the first body portion 110. The square or rectangular profile of the guide slot 168 matches the square or rectangular profile of the guide rail 126 of the first body portion 110. The cylindrical profile of the guide channel 180 matches the cylindrical profile of the guide pin 140 of the first body portion 110.

The guide rail 126 of the first body portion 110 slides into the guide slot 168 of the second body portion 150, when the first body portion 110 is coupled to the second body portion 150. The guide rail 166 of the second body portion 150 slides into the guide slot 128 of the first body portion 110, when the first body portion 110 is coupled to the second body portion 150. The guide pin 140 of the first body portion 110 slides into the guide channel 180 of the second body portion 150, when the first body portion 110 is coupled to the second body portion 150.

Figure 4A:
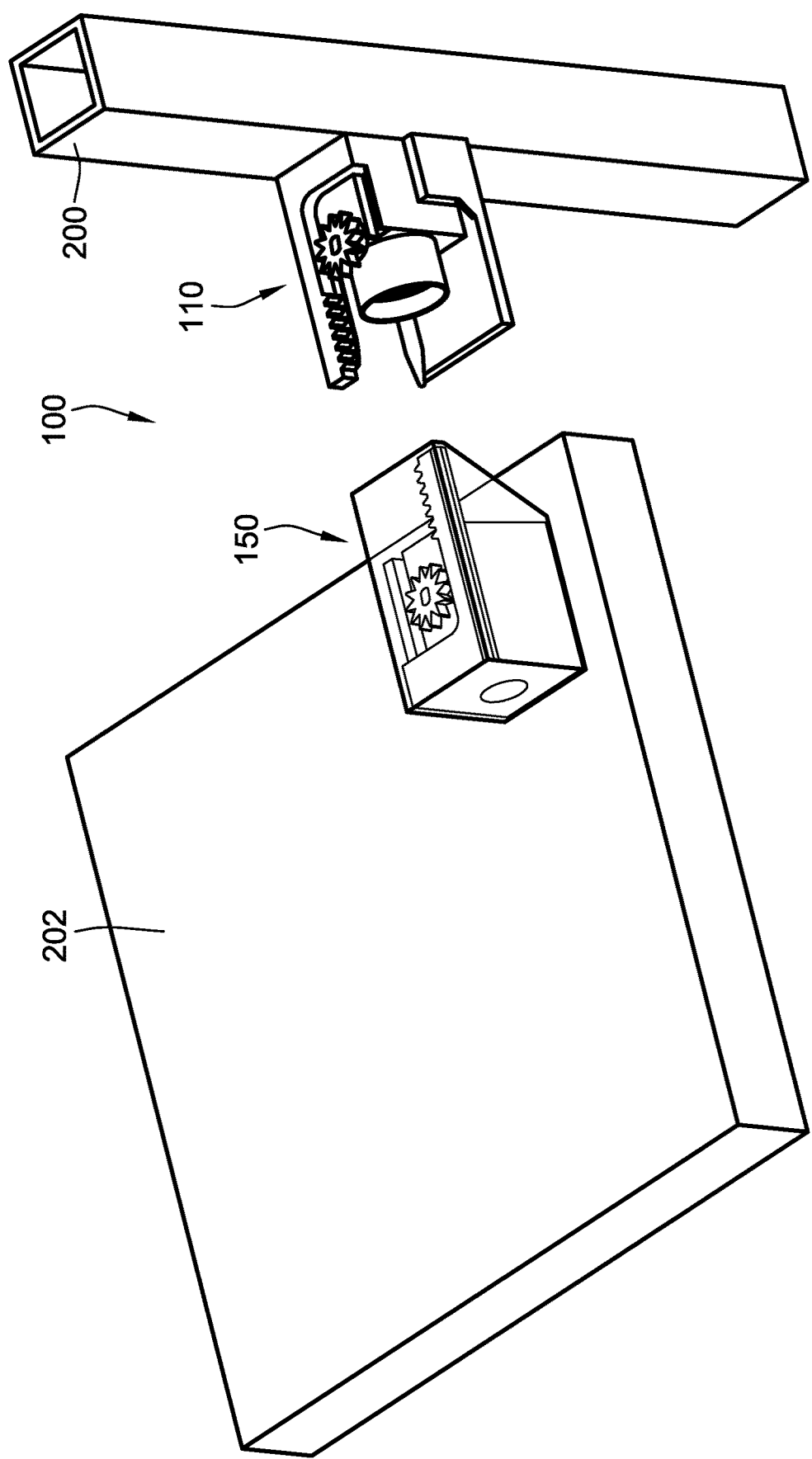
FIG. 4A is a perspective view of the example quick-connector of FIG. 1A in use with a fluid pipe and a housing when in the uncoupled configuration, according to aspects of the present disclosure.
Figure 4B:
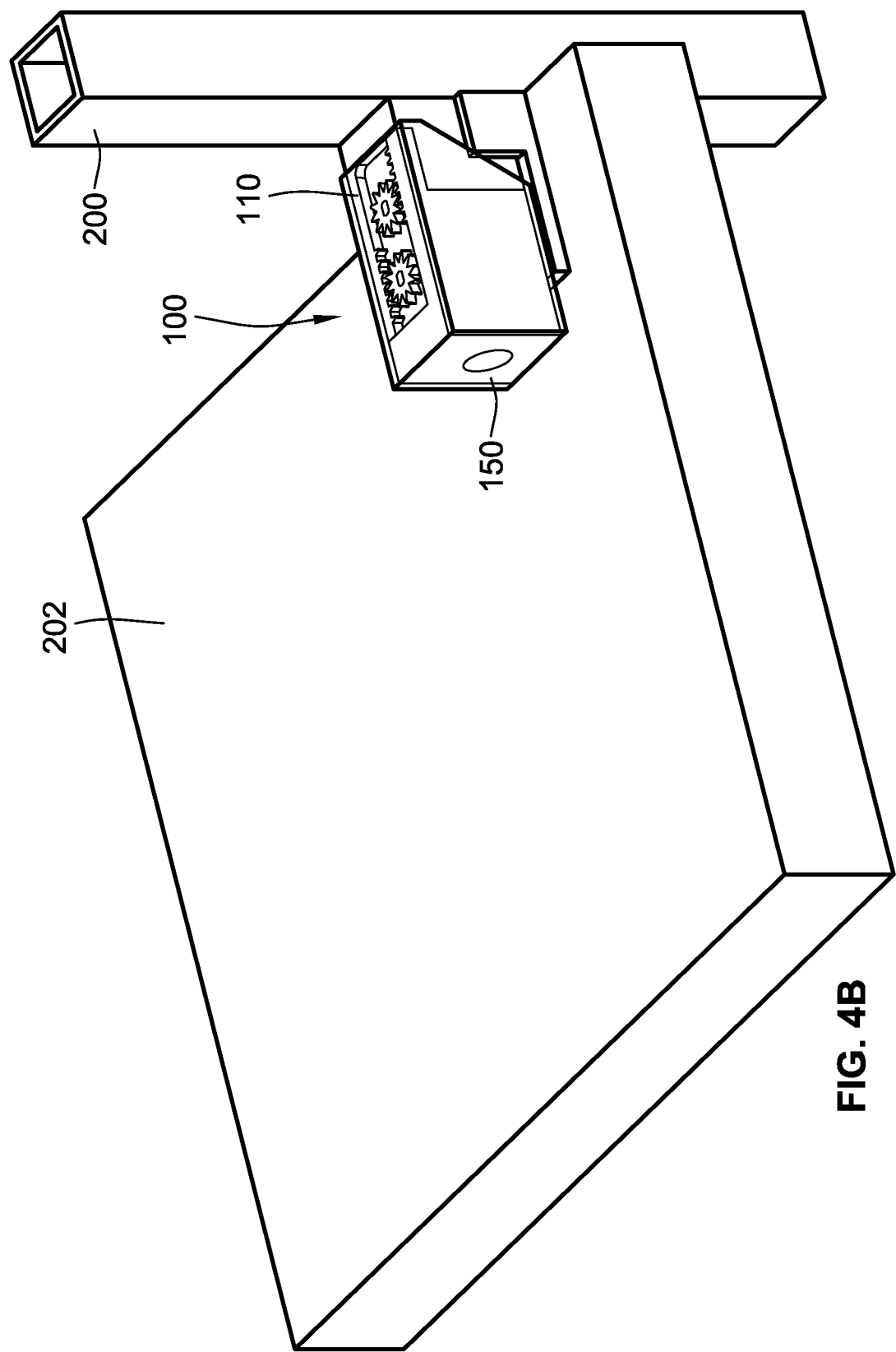
FIG. 4B is a perspective view of the example quick-connector of FIG. 1A in use with a fluid pipe and a housing when in the coupled configuration, according to aspects of the present disclosure.

FIGS. 4A and 4B shows the quick-connector 100 in use with a fluid pipe 200 and a housing 202. The fluid pipe 200 can be any suitable component that is configured to carry fluid (such as the liquid used in liquid-cooling applications) to the housing 202. The housing 202 can be the housing of any computing device that utilizes liquid cooling. In one example, the housing 202 is the housing of a server device, and the fluid pipe 200 is part of a larger fluid manifold that distributes the fluid to various ports on the housing 202. The fluid pipe 200 can be part of a rack into which the housing 202 can be inserted.

There may be multiple housings such as the housing 202. The fluid pipe 200 may be joined to various connectors at the levels of each of the ports to supply liquid cooling to components in the housings such as the housing 202. The fluid pipe 200 is part of a larger liquid cooling system for cooling the housing 202. Liquid coolant is circulated through the fluid pipe 200 through the housings and collected by a collection pipe (not shown).

In FIG. 4A, the quick-connector 100 is in the decoupled configuration, and thus the first body portion 110 is not coupled to the second body portion 150. The first body portion 110 is coupled to a port on the fluid pipe 200, while the second body portion 150 is coupled to a port on the housing 202. The first body portion 110 is spaced apart from the second body portion 150, and the ball valves 114 and 154 are thus rotated to the sealed position. In the decoupled configuration, no fluid can flow through the first body portion 110 or the second body portion 150.

In FIG. 4B, the quick-connector 100 is in the coupled configuration, and thus the first body portion 110 is coupled to the second body portion 150. In some implementations, the quick-connector 100 can be moved to the coupled configuration when the housing 202 is inserted into server rack. As the second body portion 150 moves toward and couples with the first body portion 110, the ball valves 114 and 154 move to the flow position, as discussed herein. Once the ball valves are in the flow position, fluid is allowed to flow from the fluid pipe 200, through the quick-connector 100, and into the housing 202. Generally, the housing 202 will include one or more tubes to carry the fluid to cooling mechanisms (such as cold plates) within the housing 202. Similar connectors collect the heated fluid and return the heated fluid to another outlet fluid pipe similar to the fluid pipe 200. The server device may have a heat exchanger to cool the heated liquid and return the cooled liquid to the fluid pipe 200.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A quick-connector for selectively allowing fluid flow, the quick-connector comprising:
    a first body portion defining a first fluid channel;
    a second body portion defining a second fluid channel, the second body portion being configured to be coupled to the first body portion such that the first fluid channel is aligned with the second fluid channel, forming a fluid channel extending through the quick-connector;
    at least one ball valve positioned in the fluid channel extending through the quick-connector;
    a first gear formed on a surface of the first body portion; and
    a second gear coupled to the at least one ball valve via a gear shaft, and configured to engage the first gear,
    wherein movement of the first body portion and the second body portion relative to each other causes the at least one ball valve to move between a flow position and a sealed position, the ball valve in the flow position allowing fluid to flow through the first fluid channel and the second fluid channel, the at least one ball valve in the sealed position preventing fluid from flowing through the first fluid channel and the second fluid channel.

2. The quick-connector of claim 1, wherein the at least one ball valve includes a first ball valve and a second ball valve, the first ball valve being coupled to the second gear via a first gear shaft, and wherein the quick-connector further comprises:
   a third gear formed on a surface of the second body portion; and
   a fourth gear coupled to the second ball valve via a second gear shaft, and configured to be engaged with the third gear,
   wherein movement of the first body portion and the second body portion relative to each other causes the second ball valve to move between the flow position and the sealed position, the second ball valve in the flow position allowing fluid to flow through the second fluid channel, the second ball valve in the sealed position preventing fluid from flowing through the second fluid channel.

3. The quick-connector of claim 1, wherein movement of the first body portion and the second body portion relative to each other drives the first gear, and wherein driving the first gear causes the second gear to move the at least one ball valve between the flow position and the sealed position.

4. The quick-connector of claim 3, wherein the first gear is a rack gear, and wherein the second gear is a pinion gear.

5. The quick-connector of claim 4, wherein linear movement of the first body portion relative to the second body portion linearly drives the first gear, and wherein linearly driving the first gear rotates the second gear and causes the at least one ball valve to rotate between the flow position and the sealed position.

6. The quick-connector of claim 5, wherein the second gear and the at least one ball valve rotate about an axis that is generally perpendicular to the fluid channel formed by the first fluid channel and the second fluid channel.

7. The quick-connector of claim 4, wherein the first gear is formed on a surface of the first body portion and the second gear is coupled to the at least one ball valve via the gear shaft, such that the first gear engages the second gear when the first body portion is coupled to the second body portion.

8. The quick-connector of claim 4, wherein the first body portion includes an arm extending toward the second body portion, the arm including a guide rail that is configured to slide into a guide slot defined in the second body portion, when the second body portion is coupled to the first body portion.

9. The quick-connector of claim 8, wherein the guide rail is formed on a bottom surface of the arm, and wherein the rack gear is formed on a lateral surface of the arm.

10. The quick-connector of claim 1, further comprising a first sealing member disposed on a first side of the at least one ball valve and a second sealing member disposed on a second side of the at least one ball valve, the first sealing member and the second sealing member aiding in preventing fluid from bypassing the at least one ball valve.

11. The quick-connector of claim 10, wherein the first sealing member is a first O-ring disposed in the first fluid channel or the second fluid channel, and wherein the second sealing member is a second O-ring disposed in the first fluid channel or the second fluid channel.

12. The quick-connector of claim 1, wherein the at least one ball valve is disposed in the first fluid channel of the first body portion.

13. The quick-connector of claim 12, wherein the first fluid channel includes a first region having a height greater than a height of the ball valve and a second region having a height less than the height of the ball valve.

14. The quick-connector of claim 13, wherein the at least one ball valve abuts a first end of the first region of the first fluid channel, and wherein the first body portion includes a cap positioned at a second end of the first fluid channel to secure the at least one ball valve within the first fluid channel.

15. The quick-connector of claim 1, wherein the first body portion includes an annular groove and the second body portion includes an annular protrusion configured to fit within the annular groove, the first body portion and the second body portion being coupled to each other at least in part via a friction fit between the annular groove and the annular protrusion.

16. The quick-connector of claim 1, further comprising a fluid tray positioned underneath the first body portion and the second body portion, the fluid tray being configured to collect fluid leaking from the first body portion or the second body portion.

17. The quick-connector of claim 1, wherein linear movement of the second body portion relative to the first body portion linearly drives the first gear, and wherein linearly driving the first gear rotates the second gear and causes the at least one ball valve to rotate between the flow position and the sealed position.

18. A quick-connector for selectively allowing fluid flow, the quick-connector comprising:
   a first body portion defining a first fluid channel;
   a second body portion defining a second fluid channel, the second body portion being configured to be coupled to the first body portion such that the first fluid channel is aligned with the second fluid channel, forming a fluid channel extending through the quick-connector;
   a first ball valve positioned in the first fluid channel;
   a second ball valve positioned in the second fluid channel;
   a first rack gear formed on a surface of the first body portion and a second rack gear formed on a surface of the second body portion;
   a first pinion gear coupled to the first ball valve via a first gear shaft and a second pinion gear coupled to the second ball valve via a second gear shaft;
   wherein movement of the first body portion and the second body portion relative to each other causes the first ball valve and the second ball valve to each move between a flow position and a sealed position, the first ball valve and the second ball valve in the flow position allowing fluid to flow through the first fluid channel and the second fluid channel, the first ball valve and the second ball valve in the sealed position preventing fluid from flowing through the first fluid channel and the second fluid channel.

19. The quick-connector of claim 18, wherein the first rack gear engages the second pinion gear when the first body portion is coupled to the second body portion, and wherein the first pinion gear engages the second rack gear when the first body portion is coupled to the second body portion.

20. The quick-connector of claim 19, wherein linear movement of the first body portion and the first rack gear relative to the second body portion rotates the second pinion gear and causes the second ball valve to rotate between the flow position and the sealed position within the second fluid channel, and wherein linear movement of the second body portion and the second rack gear relative to the first body portion rotates the first pinion gear and causes the first ball valve to rotate between the flow position and the sealed position within the first fluid channel.

\* \* \* \* \*